United States Patent [19]

Takano et al.

[11] Patent Number: 5,330,164
[45] Date of Patent: Jul. 19, 1994

[54] VIBRATION DAMPING APPARATUS

[75] Inventors: Kazuya Takano, Kamakura; Hiroshi Kojima, Yokohama, both of Japan

[73] Assignee: Bridgestone Corporation, Tokyo, Japan

[21] Appl. No.: 126,020

[22] Filed: Sep. 24, 1993

Related U.S. Application Data

[63] Continuation of Ser. No. 37,691, Mar. 25, 1993, abandoned, which is a continuation of Ser. No. 770,535, Oct. 3, 1991, abandoned.

[30] Foreign Application Priority Data

Oct. 11, 1990 [JP] Japan .................................. 2-272717
Feb. 18, 1991 [JP] Japan .................................. 3-023388

[51] Int. Cl.$^5$ ............................................ F16F 13/00
[52] U.S. Cl. .................................. 267/140.14; 267/219
[58] Field of Search ...................... 267/140.14, 140.15, 267/219; 180/300, 312, 902; 248/562, 636; 251/310, 311; 137/454.5; 188/322.13, 322.14

[56] References Cited

U.S. PATENT DOCUMENTS

| | | | |
|---|---|---|---|
| 560,655 | 5/1896 | Smith | 137/454.5 |
| 2,582,363 | 1/1952 | Thiry | 267/140.1 A X |
| 2,928,424 | 3/1960 | Horton et al. | 137/454.5 X |
| 4,424,961 | 1/1984 | Takei | 248/562 X |
| 4,660,812 | 4/1987 | Dan et al. | 267/140.1 A |
| 4,700,933 | 10/1987 | Chikamori et al. | 180/300 X |
| 4,709,779 | 12/1987 | Takehara . | |
| 4,709,791 | 12/1987 | Houghton | 188/315 |
| 4,789,143 | 12/1988 | Smith et al. | 248/562 X |
| 4,796,875 | 1/1989 | Mertens et al. | 267/140.1 A |
| 4,838,527 | 6/1989 | Holley | 188/322.14 X |
| 4,852,864 | 8/1989 | Bitschkus et al. | 267/219 |
| 4,877,225 | 10/1989 | Noguchi et al. | 267/140.1 R |
| 4,889,326 | 12/1989 | Bouhours | 248/562 X |

FOREIGN PATENT DOCUMENTS

| | | |
|---|---|---|
| 3619685A1 | 12/1987 | Fed. Rep. of Germany . |
| 3409355C2 | 6/1988 | Fed. Rep. of Germany . |
| 3404593C2 | 10/1989 | Fed. Rep. of Germany . |
| 60-95244 | 6/1985 | Japan . |
| 220239 | 11/1985 | Japan .................................. 267/219 |
| 197835 | 9/1986 | Japan .......................... 267/140.1 A |
| 46337 | 2/1990 | Japan .......................... 267/140.1 A |
| 1470 | of 1878 | United Kingdom ................. 251/310 |

Primary Examiner—Mark T. Le
Attorney, Agent, or Firm—Oliff & Berridge

[57] ABSTRACT

A vibration damping apparatus which is particularly applicable to an automotive engine mount and capable of fully absorbing vibration from vibration generating sources. A sleeve is secured to the automotive engine unit, and a housing is secured to the vehicle body. Once the vibration generated by the automotive engine is transmitted to the sleeve, liquid loaded in a main liquid chamber flows to a sub liquid chamber via a plurality of restricting passages. Vibration is effectively absorbed by the transit resistance against liquid flowing through those restricting passages. Independent of these restricting passages, a cylindrical member is provided which penetrates through the housing and a partition wall block. The cylindrical member is disposed in the path of the restricting passages providing connection between the main and sub liquid chambers. A hollow rotor is rotatably provided, inside of and on the same axial line as the cylindrical member, for opening and closing the restricting passages. When low-frequency vibration is generated, only the restricting passage devoid of the hollow rotor provides connection between the main and sub liquid chambers. Conversely, when high-frequency vibration is generated, those restricting passages each containing the hollow rotor and having a large sectional area are released to provide connection between both chambers thus reliably and effectively absorbing vibrations throughout an extensive range of frequencies.

18 Claims, 16 Drawing Sheets

VIBRATION DAMPING APPARATUS

This is a continuation of application Ser. No. 08/037,691 filed Mar. 25, 1993, now abandoned, which in turn is a continuation of application Ser. No. 07/770,535 filed Oct. 3, 1991, now abandoned.

BACKGROUND OF THE INVENTION

1. Field of the Invention

The present invention relates to a vibration damping apparatus which is particularly available for a vehicle engine mount to fully absorb vibration propagated from a variety of vibration generating sources.

2. Background information

A typical vehicle engine is provided with a vibration damping apparatus serving as the engine mount between the engine unit and the vehicle body. Any conventional vibration damping apparatus is internally provided with a main liquid chamber and a sub liquid chamber respectively being filled with liquid, which are internally connected to each other via a plurality of restricting passages. Whenever vibration of engine is propagated to the vibration damping apparatus, liquid in both chambers passes through these restricting passages so as to absorb vibration by the effect of transit resistance or liquid column resonance in the liquid-filled restricting passages.

A typical vehicle engine generates a variety of vibrations including shaking vibration which occurs while the vehicle runs at about 70 kilometers per hour of velocity and idling vibration which occurs while the vehicle runs at an extremely slow velocity such as 5 kilometers per hour for example.

Generally, the shaking vibration generates a maximum frequency of 15 Hz, whereas the idling vibration generates 20 through 40 Hz of frequencies, and thus both vibrations are physically different from each other.

On the other hand, any of the conventional vibration-proof apparatuses is functionally effective only in a specific range in which the frequencies of the vibration can be determined in accordance with the area and the length of aperture of each limited passage. In other words, any conventional vibration damping apparatus cannot effectively damp and absorb vibration containing frequencies out of the predetermined range.

To compensate for this, if any adjustment were applied to such a conventional vibration damping apparatus in order to effectively damp the shaking vibration, then, conversely, it cannot effectively damp the idling vibration, and vice versa.

SUMMARY OF THE INVENTION

Therefore, the object of the invention is to fully solve the technical problems mentioned above by providing a novel vibration damping apparatus which is capable of correctly and fully damping and absorbing vibration throughout an extensive range of frequencies based on a simple structure which permits manufacturers to easily manufacture it.

The invention provides a novel vibration damping apparatus which fully absorbs vibration propagated from a variety of vibration sources. In particular, the vibration damping apparatus is ideally suited for the engine mount of a vehicle.

The first securing member is connected to either a vibration generating source or a vibration receiving member, while the second securing member is connected to the other one of these two. An elastic member provides connection between the first and second securing members. The elastic member itself is subject to deformation whenever vibration is generated. A main liquid chamber is provided, which uses part of the elastic member to make up its own wall and is connected to a sub liquid chamber via a plurality of restricting passages.

Whenever vibration is generated, the vibration is effectively absorbed by the effect of transit resistance or liquid column resonance of liquid in the restricting passages which respectively provide a connection between the main liquid chamber and the sub-liquid chamber. A member which forms a restricting passage is installed in at least one of the plural limited passages, where this member serves as a partition wall separating the main liquid chamber from the sub liquid chamber. A means for controlling the limited passages is provided for at least one of the limited passages. The control member is provided with a cylindrical member having opening, and the control member penetrates through the first securing member and the restricting passage forming member. The restricting passage control member varies the sectional area of the aperture of at least one of the restricting passages so that vibration containing a variety of frequencies can be effectively and fully absorbed.

According to the vibration damping apparatus embodied by the invention, vibration propagated from a variety of vibration generating sources is received by a vibration receiving member via an elastic member. Propagated vibration is not only absorbed by the effect of the resistance generated by internal friction of the elastic member, but it is also absorbed by the effect of transit resistance or liquid column resonance of liquid in the limited passages between the main and sub liquid chambers.

In particular, since a plurality of limited passages are provided, and at the same time, one or more of these limited passages is connected to a limited-passage control means, vibration containing a variety of frequencies can be properly damped. Specifically, the vibration damping apparatus embodied by the invention can effectively damp vibration in the presence of low-frequency vibration by contracting the sectional area of the aperture of each limited passage. In other words, vibration is fully absorbed by those limited passages having the sectional area of the apertures contracted by the limited-passage control member, or, by those limited passages having a narrow sectional area of apertures without being provided with control members which respectively provide direct connection between the main and sub liquid chambers.

When high-frequency vibration is present, the limited passages having a narrow sectional area of aperture clog themselves. To compensate for this, the vibration damping apparatus needs to operate those limited passages having a wide sectional area of aperture. Even when this need arises, according to the vibration damping apparatus embodied by the invention, high-frequency vibration can also effectively be absorbed by expanding the sectional area of the apertures of the limited-passage control member by operating the limited-passage control member itself.

The vibration damping apparatus embodied by the invention allocates the limited-passage control member to one or a plurality of limited passages in those situations including the following: a case in which a main liquid chamber and a sub-liquid chamber are connected to each other via a plurality of restricting passages: a case in which either one or a plurality of restricting passage control members is provided for a restricting passage or all the restricting passages; a case in which a main liquid chamber and a plurality of sub-liquid chambers are respectively connected to each other by a plurality of restricting passages, in other words, the case in which a plurality of liquid chambers are connected to each other in series by a plurality of liquid passages.

DESCRIPTION OF THE PREFERRED EMBODIMENTS

Figure 1:
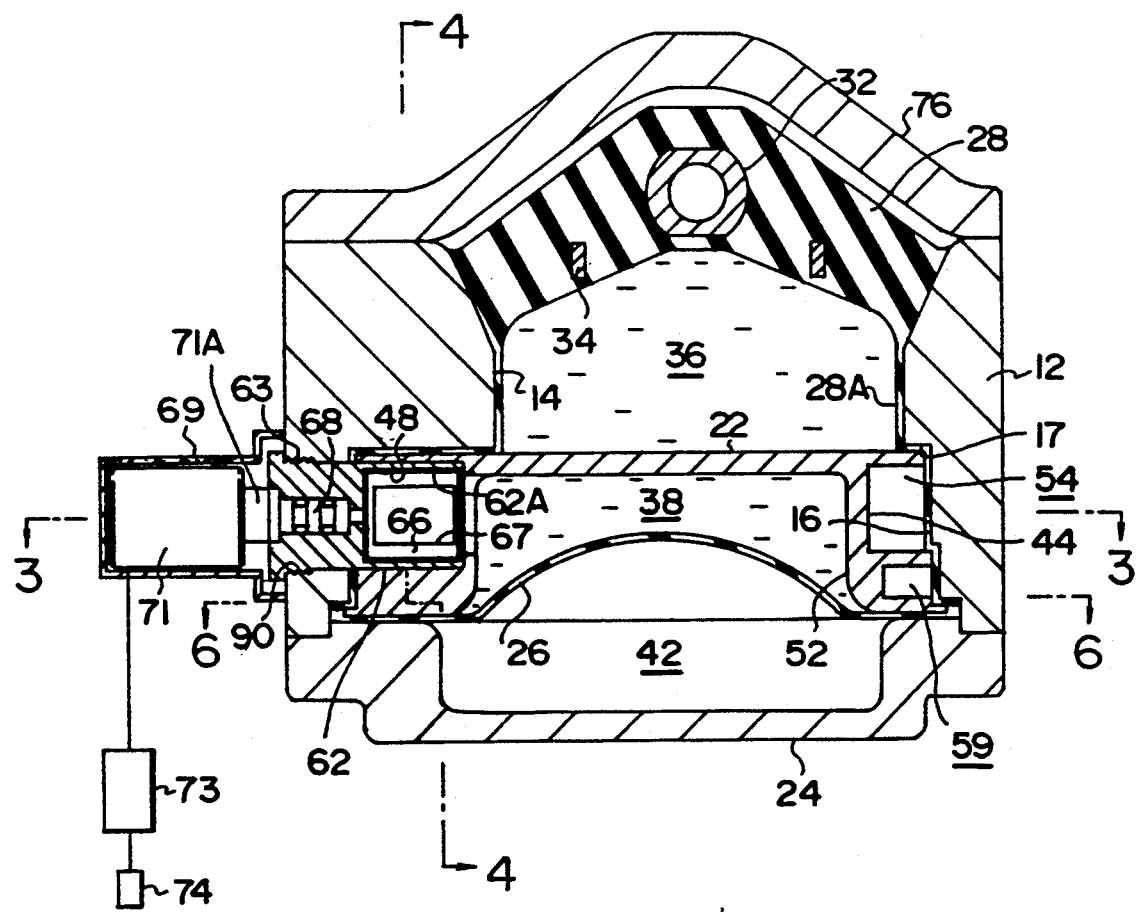
FIG. 1 is a vertical sectional view of a vibration damping apparatus according to a first embodiment of the invention.

FIGS. 1 through 6 illustrate a vibration damping apparatus 10 according to a first embodiment of the invention. The vibration damping apparatus 10 has a rectangular housing 12 which itself makes up a securing member on one side of the vibration damping apparatus 10, where the rectangular housing 12 is structured in the block form internally containing hollow domain 14 which extends through the housing 12 in the vertical direction as shown in FIG. 1.

The bottom of the hollow domain 14 of the housing 12 substantially makes up a diameter-expanded domain 16 having an expanded inner diameter across a step region 17. A partition wall block 22 is inserted into the diameter-expanded domain 16 in the upward direction from the bottom. The partition wall block 22 is secured to the housing 12 by means of a bottom plate 24 which is secured to the lateral surface of the housing 12. The circumferential edge of a diaphragm 26 is secured between the partition wall block 22 and the bottom plate 24.

The hollow domain 14 has slopped inner surfaces at two opposing sides whose distance apart gradually increases in the upward direction. The external surface of an elastic member 28 is secured to the surface of inner domain 12 vulcanizing means. An extended part 28A vertically extended downward integrally with the elastic member 28, is disposed on the inner surface of the hollow domain 14 and the diameter-expanded domain 16.

A sleeve 32 is secured to the center of the elastic member 28 to comprise a securing member on the other side, of the vibration-proof apparatus 10. A plate 34 is installed inside of the elastic member 28 in order to adjust rigidity of the elastic member 28.

A plurality of liquid chambers are formed by those components including the hollow domain 14, the elastic member 28, and the diaphragm 26. All the liquid chambers are filled with water or oil. The liquid is separated by the partition wall block 22. A main chamber 36 is formed between the partition wall block 22 and the elastic member 28. A sub-liquid chamber 38 is formed between the partition wall block 22 and the diaphragm 26. An air chamber 42 is formed between the diaphragm 26 and the bottom plate 24, where the air chamber 42 can atmospherically be connected as required.

For example, the housing 12 is secured to the vehicle body, while sleeve 32 is secured to the engine, so as to cause the elastic member 28 to hold the load delivered to the vehicle body from the engine unit. At the same time, the load is also applied to the main liquid chamber 36 in the form of compressive force.

Figure 2:
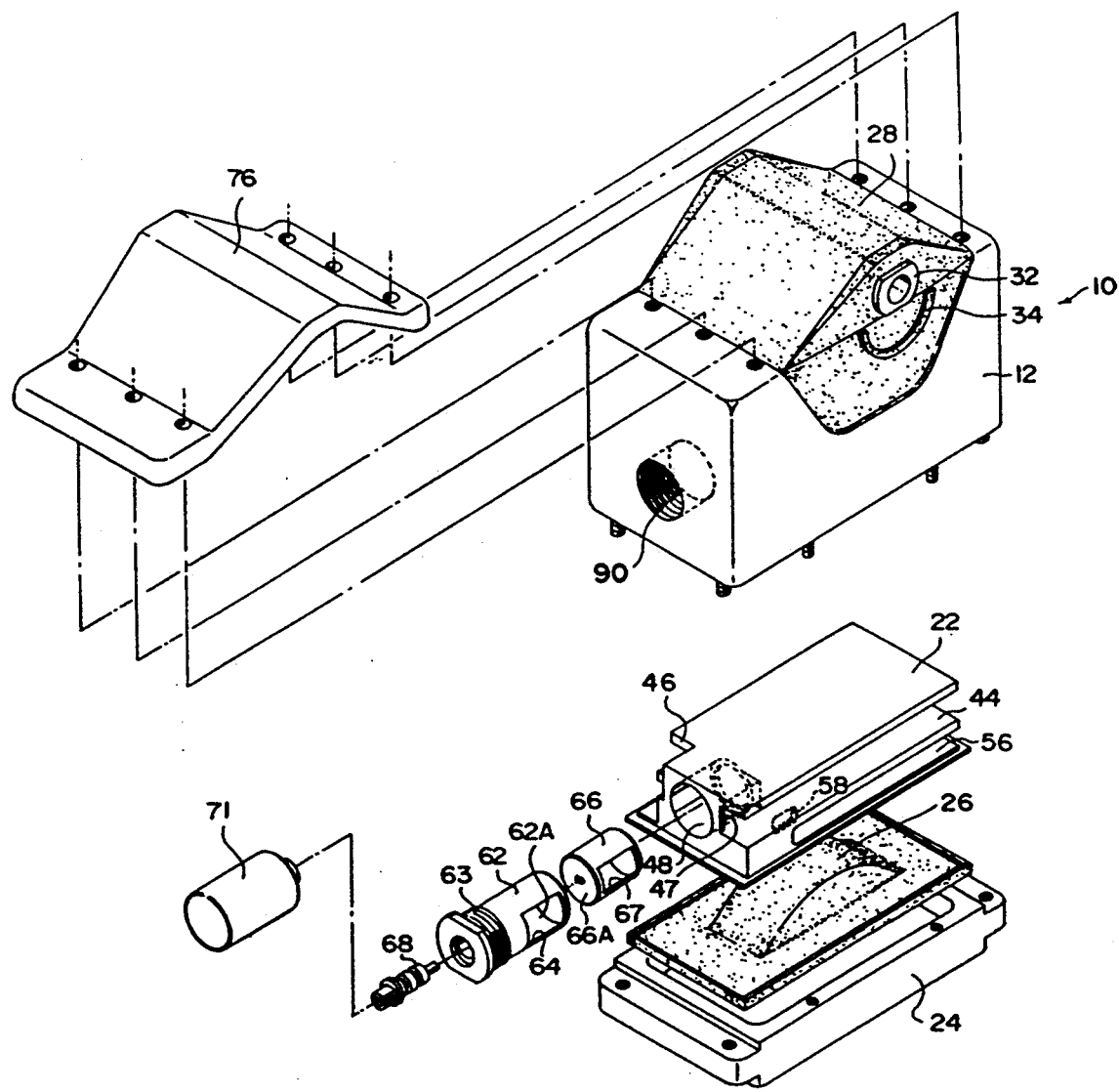
FIG. 2 is a perspective view of disassembled components of the vibration damping apparatus shown in FIG. 1.
Figure 3:
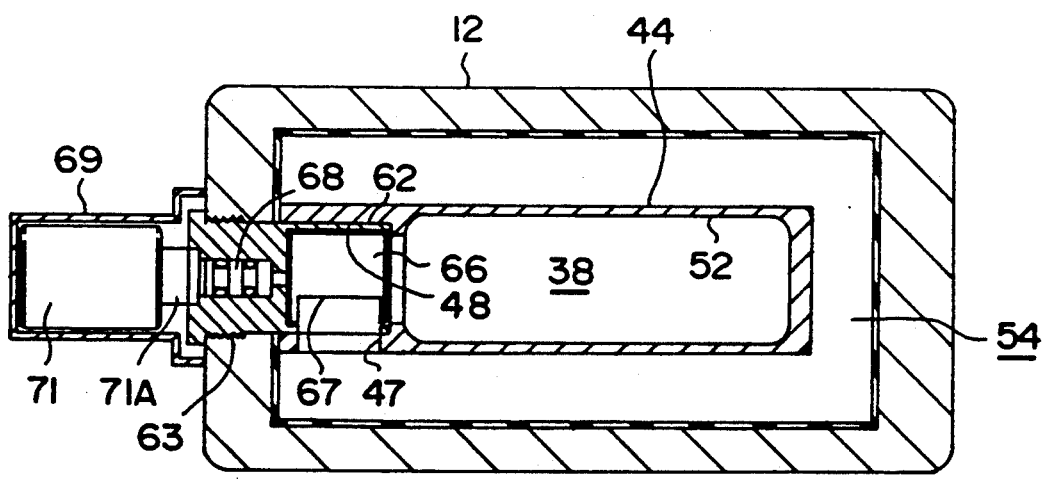
FIG. 3 is a sectional view of the vibration damping apparatus taken along the line 3—3 in FIG. 1.
Figure 4:
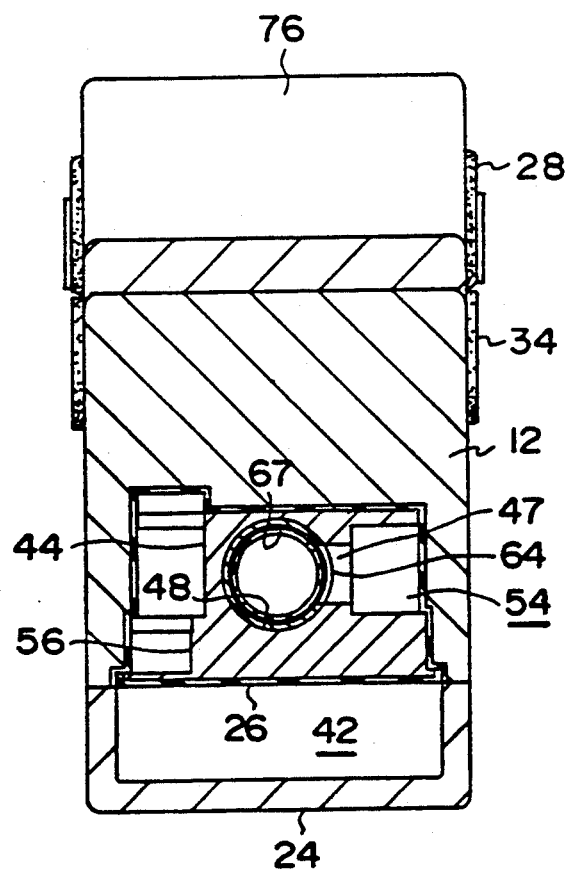
FIG. 4 is a sectional view of the vibration damping apparatus taken along the line 4—4 in FIG. 1.
Figure 5:
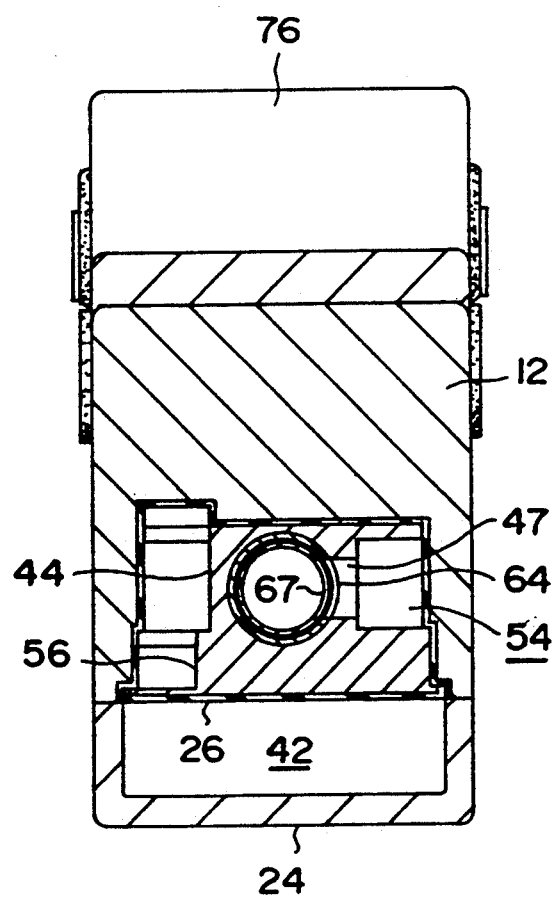
FIG. 5 is a sectional view of the vibration damping apparatus shown in FIG. 4 showing an operative state.
Figure 6:
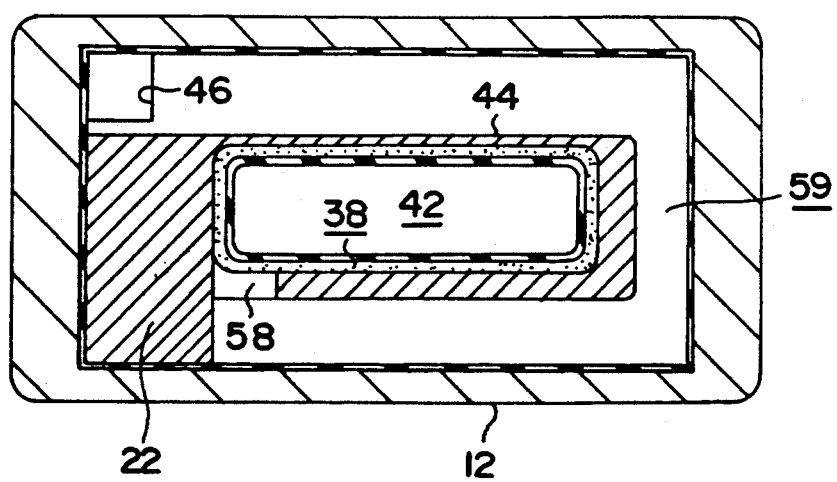
FIG. 6 is a sectional view of the vibration damping apparatus taken along the line 6—6 in FIG. 1.

As shown in FIGS. 2 and 3, a large groove 44 is provided at the outer periphery of the partition wall block 22. The large groove 44 is U-shaped in the longitudinal direction as shown in FIG. 3, but it has rectangular shape in the longitudinal orthogonal direction as shown in FIG. 4. One end of the large groove 44 is connected to the main liquid chamber 36 via a rectangular opening 46, whereas the other end of the large groove 44 is communicated to an cylindrical hole 48 via a rectangular opening 47.

As shown in FIG. 1, the cylindrical hole 48 penetratively extends itself from the external wall of the partition wall block 22 to the internal recess 52 which is formed in the direction of the main liquid chamber 36. Part of the inner circumferential wall of the cylindrical hole 48 is connected to the large groove 44 via the rectangular opening 47. Because of this structure, when the partition wall block 22 is assembled to the housing 12, the external edge of the large groove 44 is blocked by the inner surface member of the diameter-expanded member 16, more particularly, the large groove 44 is blocked by the extended member 28A of the elastic member 28. Owing to this arrangement, a restricting passage 54 is formed. An end of the large groove 44 is connected to the main liquid chamber 36 by means of the rectangular opening 46, whereas the other end of the large groove 44 is communicated to the sub-liquid chamber 38 via the cylindrical hole 48.

A small groove 56 is formed at a position closer to the sub-liquid chamber 38 than the large groove 44 and in parallel therewith. As shown in FIGS. 2 and 4, an end of the small groove 56 is connected to the main liquid chamber 36 via the rectangular opening 46, whereas the other end is connected to the recess 52 via a through-hole 58. In consequence, the small groove 56 forms a restricting passage 59 having a portion of its external wall formed by the diameter-expanded member 16. Both ends of the restricting passage 59 are respectively connected to the main liquid chamber 36 and the sub-liquid chamber 38 via the rectangular opening 46 and the through-hole 58. The longitudinal orthogonal sectional area of the restricting passage 59 is narrower than that of the restricting passage 54.

A cylindrical member 62 is inserted in the cylindrical hole 48. As shown in FIG. 1, the cylindrical member 62 penetrates through an insertion hole 90 of the housing 12, and then, a screw member 63 provided on the external circumference of the cylindrical member 62 is engaged with a thread portion provided inside the insertion hole 90 of the housing 12 so that the cylindrical member 62 can be secured to the housing 12.

A hollow domain 62A is provided in cylindrical member 62, at a position close to the tip end thereof. Cylindrical member 62 is inserted in the cylindrical hole 48, where the hollow domain 62A has a coaxial, cylindrical hole coaxially being extended from the tip. A rectangular opening 64 is provided on part of the external circumferential surface of the cylindrical member 62. The cylindrical member 62 is secured to the housing 12 in order that the rectangular opening 64 can correctly match the other rectangular opening 47.

A rotor 66 is coaxially inserted in the hollow domain 62A. The tip of the rotor 66 is open and has hollow cylindrical form. The interior and the exterior of the rotor 66 are connected to each other by a rectangular through-hole 67 which is formed in part of the wall of the rotor 66. A blocking wall 66A closing the open tip and the opposite side of the rotor 66 is secured to the tip of a rotary shaft 68 which is held by the cylindrical member 62. The other end of the rotary shaft 68 projects from the housing 12 and is connected to an output shaft 71A of motor 71. The motor 71 is secured to the housing via a case 69. A controller 73 controls the supply of DC power to the motor 71. A sensor 74 of the controller 73 detects the number of rotations of the engine, vehicle velocity, and frequencies of vibration. The controller 73 controls the rotation of the motor 71 in correspondence with the frequencies to be absorbed. Both ends of a cover member 76 are secured to the tip of the housing 12 in order that the maximum stroke of the sleeve 32 can be controlled.

Next, operational features of the vibration damping apparatus according to the first embodiment of the invention are described below.

When the vehicle engine generates vibration containing relatively low frequencies, such as shaking vibration with a maximum of 15 Hz, the controller 73 feeds DC power to the motor 71 to cause the through-hole 67 of the rotor 66 to enter into a condition in which it is not matched with the rectangular opening 47 as shown in FIG. 4. As a result, the restricting passage 54 is shut off by the lateral wall of the rotor 66, and as a result, only the restricting passage 59 is connected to the main liquid chamber 36 and the sub-liquid chamber 38. After connecting the restricting passage 59 containing a relatively narrow effective sectional area to the main and sub liquid chambers 36 and 38, variation of pressure in the main liquid chamber 36 caused by the vibrating engine is effectively absorbed by the effect of transit resistance or liquid-column resonance generated in the restricting passage 59.

Conversely, when the vehicle engine generates idling vibration containing relatively high frequencies ranging from 20 to a maximum of 40 Hz for example, the restricting passage 59 clogs itself. To compensate for this, the controller 73 feeds DC power to the motor 71 to rotate the rotor 66 up to the position where the through-hole 67 correctly matches the opening 64 shown in FIG. 5. As a result, the through-hole 67 is connected to the rectangular opening 47 to cause the restricting passage 54 to be connected to the main liquid chamber 36 and the sub liquid chamber 38. As a result, vibration containing relatively high frequencies generated in the main liquid chamber 36 is effectively absorbed by the effect of transit resistance or liquid-column resonance generated in the restricting passage 54 having a large effective sectional area.

According to the first embodiment, the rotor 66, which has been accommodated inside the cylindrical member 62, is subject to rotation. Since the cylindrical member 62 is inserted into and assembled with the cylindrical hole 48, the rotor 66 securely rotates inside of the cylindrical member 62 to open and close the rectangular opening 47. In consequence, a faulty centering effect caused by incorrect disposition of the rotor 66 in the cylindrical hole 48, and irregular rotation of the rotor 66 can respectively be eliminated.

Except for the disposition of the rotor 66 inside of the annular hole via the cylindrical member 62, as far as the cylindrical hole 48 and the rotor 66 can correctly be assembled to the predetermined positions, the scope of the first embodiment of the invention is by no means restricted to the structure mentioned above.

Next, referring to FIGS. 7 through 11, the vibration damping apparatus according to the second embodiment of the invention is described below.

Figure 7:
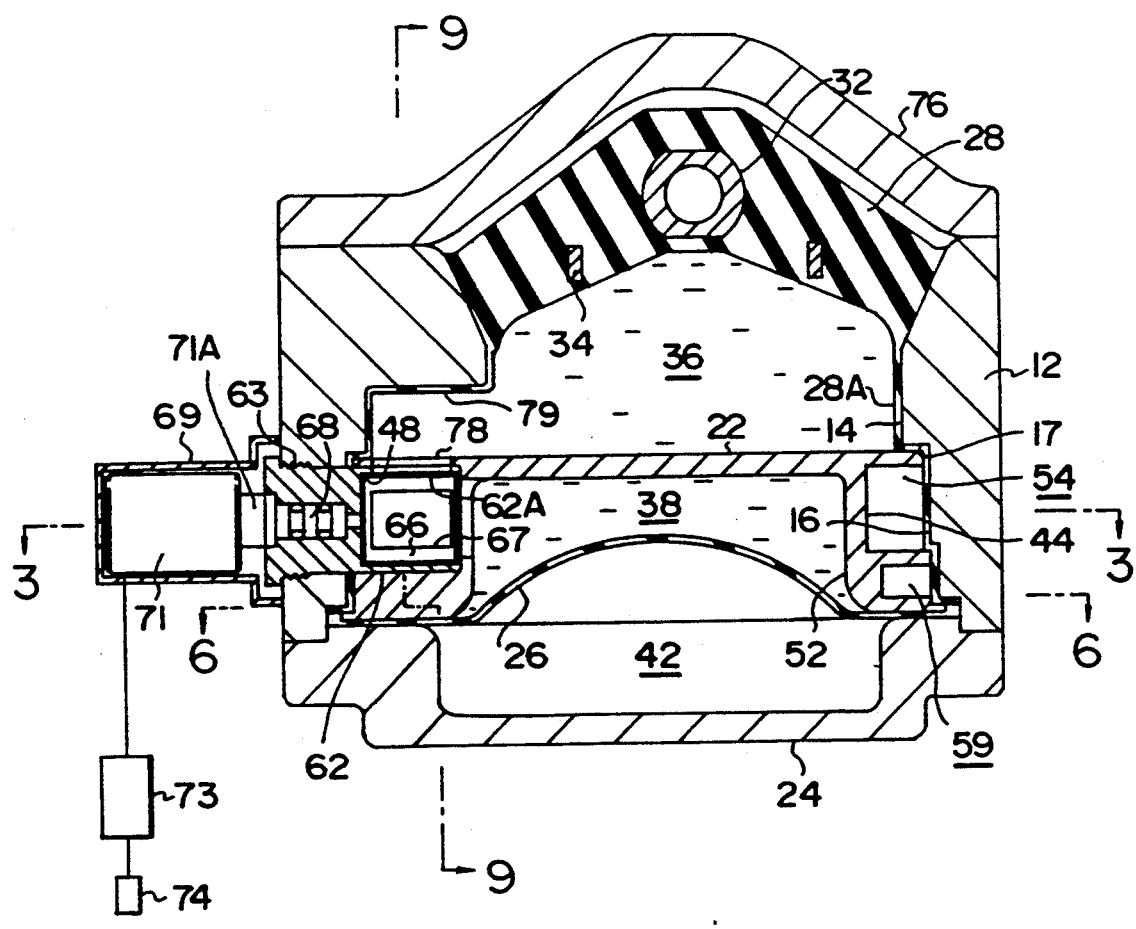
FIG. 7 is a vertical sectional view of a vibration damping apparatus according to a second embodiment of the invention.
Figure 8:
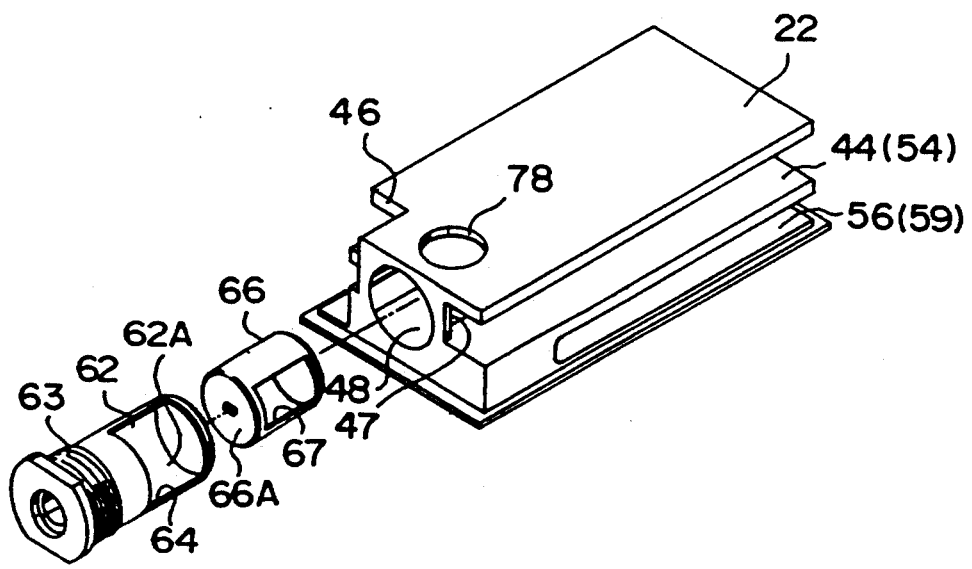
FIG. 8 is a perspective view of a partition wall block unit of the vibration damping apparatus according to the second embodiment of the invention.

As shown in FIGS. 7 and 8, a vibration damping apparatus according to a second embodiment provides a through-hole 78 on the top of the partition wall block 22. Notch 64 of the cylindrical member 62 has a size capable of connecting the through-hole 78 to the hollow domain 62A. Like the rectangular opening 47, the through-hole 78 permits part of the circumferential wall of the cylindrical hole 48 to be communicated with the main liquid chamber 36. However, unlike the rectangular opening 47, the through-hole 78 directly connects the cylindrical hole 48 to the main liquid chamber 36. In addition to the restricting passages 54 and 59, the through-hole 78 itself makes up the third restricting passage, which has an effective sectional area substantially larger than those of other restricting passages and lower transit resistance value. As shown in FIG. 7, in order to connect the through-hole 78 to the main liquid chamber 36, the second embodiment provides opening 79 in part of the interior of the housing 12.

Figure 9:
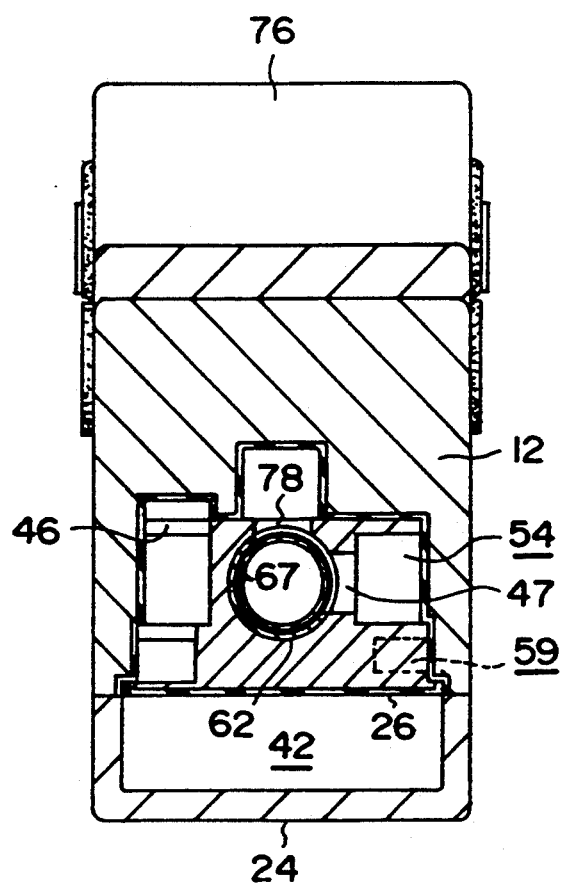
FIG. 9 is a sectional view of the vibration damping apparatus according to the second embodiment in correspondence with those which are shown in FIGS. 4 and 5.
Figure 10:
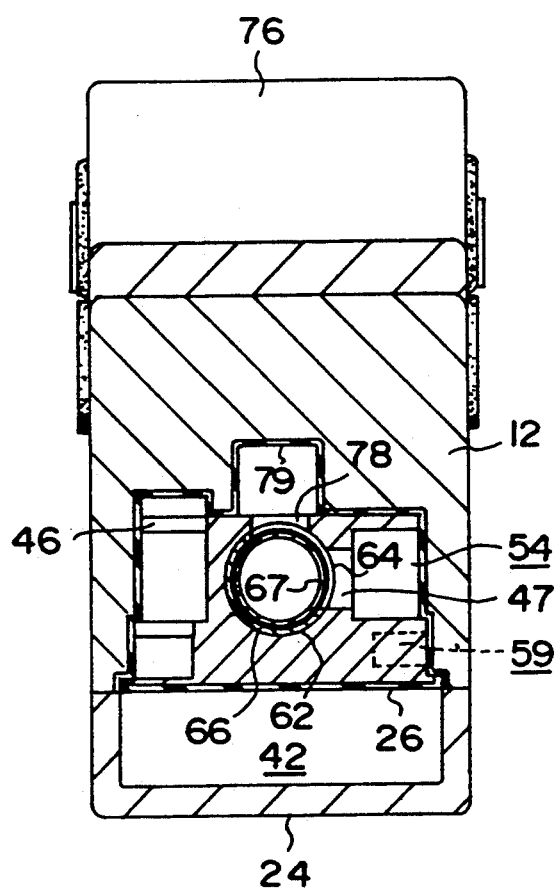
FIG. 10 is a sectional view of the vibration damping apparatus according to the second embodiment in correspondence with those which are shown in FIGS. 4 and 5.
Figure 11:
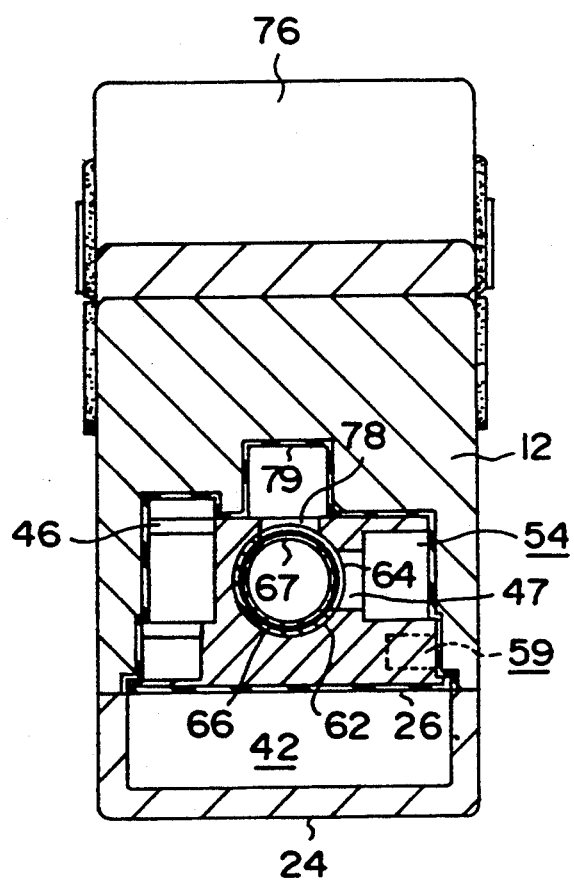
FIG. 11 is a sectional view of the vibration damping apparatus according to the second embodiment in correspondence with those which are shown in FIGS. 4 and 5.

Therefore, when the through-hole 67 of the rotor 66 is disposed in the manner shown in FIG. 9, the through-hole 67 does not match either of the rectangular opening 47 and the through-hole 78, then only the restricting passage 59 interconnecting the main and sub-liquid chambers 36 and 38 and having the least effective sectional area can absorb vibration of relatively low frequencies. As shown in FIG. 10, when the through-hole 67 correctly matches the rectangular opening 47, the restricting passage 59 clogs itself. When this condition is present, the other restricting passage 54 effectively absorbs the vibration. Furthermore, as shown in FIG. 11, when the through-hole 67 of the rotor 66 matches the through-hole 78, and yet, even when those restricting passages 54 and 59 respectively clog themselves as a result of the occurrence of vibration containing extremely high frequencies like a minimum of 50 Hz for example, the through-hole 78 can securely absorb this vibration.

The second embodiment provides a structure with permits the rotor 66 to open and close the rectangular opening 47 and the through-hole 78. In addition, not only does rotor 66 function to fully open and close both the rectangular opening 47 and the through-hole 78 but also closes either of them to a halfway position and thus control the half-open sectional areas of the rectangular opening 47 and the through-hole 48.

Figure 12:
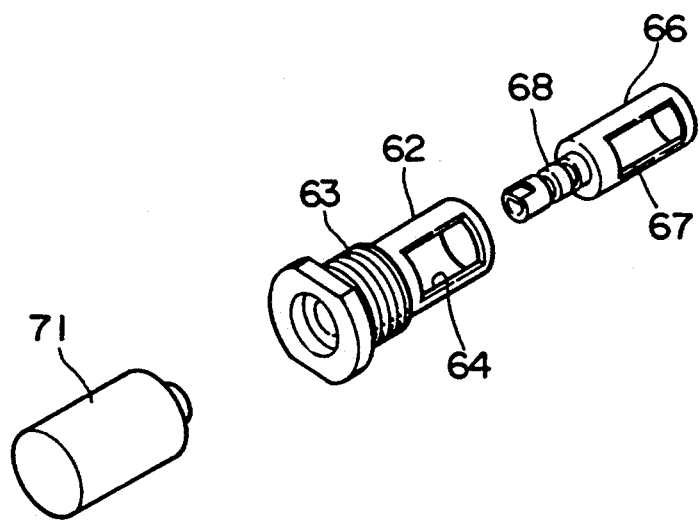
FIG. 12 is a perspective view of disassembled components of a vibration damping apparatus according to a third embodiment of the invention.
Figure 13:
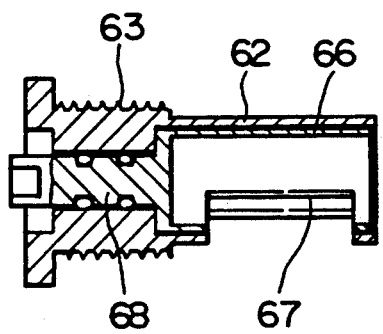
FIG. 13 is a sectional view of the assembled components shown in FIG. 12.

Next, referring to FIGS. 12 and 13, a vibration damping apparatus according to a third embodiment of the invention is described below.

The third embodiment provides a structure in which the rotor 66 and the rotary shaft 68 are coaxially secured to each other in advance of the overall assembly of the apparatus. More particularly, the rotor 66 and the rotary shaft 68 are made of identical metallic material by executing a cutting process or a molding process. Like the preceding embodiments, the third embodiment provides a structure in which the rotary shaft 68 penetrates through the cylindrical member 62 and then the motor 71 is connected to the tip of the rotary shaft 68. Nevertheless, according to the third embodiment, since the rotary shaft 68 is previously secured to the rotor 66, the axes of the two are precisely coaxial. This in turn frees manufacturers from the critical work of correctly aligning axes when connecting them to each other which is required in the previous embodiments.

Specifically, the motor 71 is previously secured to the tip of the rotary shaft 68 which penetrates through the cylindrical member 62, by inserting the rotor 66 into the cylindrical member 62. Next, while this condition is present, the screw 63 of the cylindrical member 62 is engaged with the housing 12. Alternatively, after securing the cylindrical member 62 to the housing 12 with the screw 63, the motor 71 is secured to the rotary shaft 68 which projects itself from the cylinder member 62. In this case, a specific structure may also be introduced in order to prevent the rotor 66 from moving in the axial direction within the cylindrical member 62 so that the rotor 66 can be prevented from being pulled out of the cylinder member 62 by the force of the rotary shaft 68 affecting in the axial direction in the course of connecting the rotary shaft 68 to the motor 71.

Figure 14:
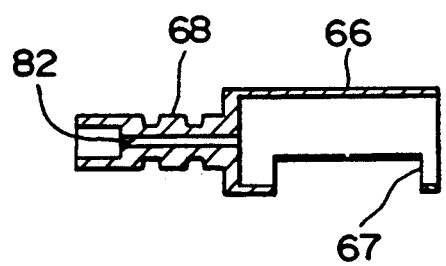
FIG. 14 is a sectional view of a vibration damping apparatus according to the fourth embodiment of the invention.

Next, according to a fourth embodiment of the invention shown in FIG. 14, a through-hole 82 is provided through the axial line of the rotary shaft 68. Liquid can be loaded into respective liquid chambers through needles (not shown) which are inserted in the through-hole 82. When loading liquid, an aperture may be provided in front of each liquid chamber to atmospherically release air pushed forward by the inflowing liquid, or internal air may be released from the intervals between the needles and the through-hole 82 by disposing the through-hole 82 at a higher position than the needles.

After fully loading liquid, the through-hole 82 is closed by inserting rubber stoppers, or the through-hole 82 may be automatically closed by means of the motor 71.

Figure 15:
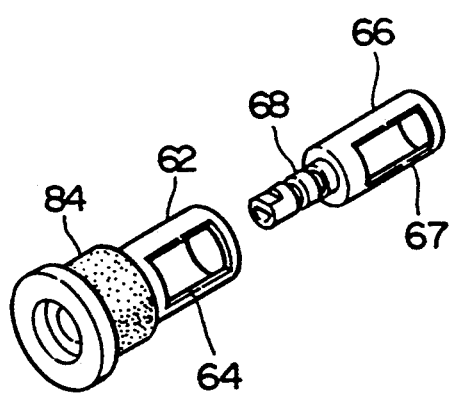
FIG. 15 is a perspective view of disassembled components of a vibration damping apparatus according to a fifth embodiment of the invention.
Figure 16:
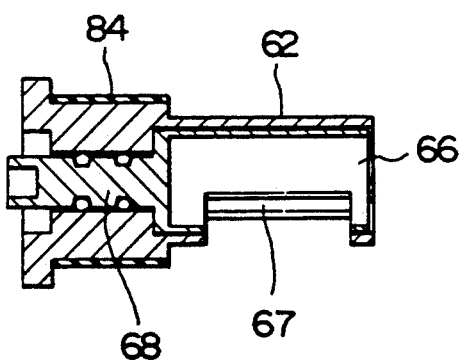
FIG. 16 illustrates assembled components of the vibration damping apparatus shown in FIG. 15.

FIGS. 15 and 16 respectively designate the vibration damping apparatus according to the fifth embodiment of the invention. In place of the screw member 63, the fifth embodiment provides a cylindrical rubber member 84 for the cylindrical member 62. Internal surface of the rubber member 84 is secured to the external surface of the cylindrical member 62 by means of vulcanizing process. The cylindrical member 62 is thrust into the housing 12 before being fixed. The cylindrical member 62 is thrust into the housing 12 producing an elastic deformation of the rubber member 84 and thereby airtightly sealing the interval between the cylindrical member 62 and the through-hole 78 of the housing 12. Therefore, the fifth embodiment permits manufacturers to more easily execute the process for assembling the rotor 66 with the cylindrical member 62 than those processes done for the preceding embodiments.

By virtue of the structural feature mentioned above, the vibration damping apparatus embodied by the invention securely and fully absorbs vibration containing a wide-range of frequencies. These embodiments of the invention permit manufactures to precisely position the rotor when inserting it into an cylindrical member provided for part of limited passages to facilitate them to easily assemble the vibration damping apparatus embodied by the invention.

What is claimed is:

1. A vibration damping apparatus, comprising:
   a first securing member which is connected to one of a vibration generating source and a vibration receiving member;
   a second securing member which is connected to the other of said vibration generating source and said vibration receiving member;
   an elastic member which provides a connection between said first securing member and said second securing member and is subject to deformation whenever vibration occurs;
   a main liquid chamber, a portion of a wall of which is formed by a part of said elastic member, said main liquid chamber being subject to expansion and contraction when vibration occurs;
   a sub-liquid chamber which is interconnected with said main liquid chamber via a plurality of restricting passages and which is subject to expansion and contraction when vibration occurs;
   a restricting passage forming member, which contains at least two of said restricting passages and has a recess which defines said sub-liquid chamber, being secured to one of said first securing member and said second securing member; and
   a restricting passage control means for varying the sectional area of an aperture of at least one restricting passage between said main liquid chamber and said sub-liquid chamber, wherein said restricting passage control means comprises a hollow rotor and a cylindrical member, said cylindrical member is inserted in an insertion hole of said one of said first securing member and said second securing member securing said restricting passage forming member and in a cylindrical hole substantially coaxial with said insertion hole and extending through said restricting passage member to said recess, said hollow rotor is coaxially inserted in said cylindrical member so as to enable the sectional area of said aperture of at least one of said restricting passage to be varied.

2. A vibration damping apparatus according to claim 1, wherein said hollow rotor has an aperture in part of a circumferential wall thereof, and wherein said aperture is connected the aperture of one of said restricting passages.

3. A vibration damping apparatus according to claim 2, wherein said restricting passage control means has a drive-force transmission shaft which is connected to a drive source, and wherein said drive-force transmission shaft is held on the axial line identical to that of said cylindrical member connected to said hollow rotor.

4. A vibration damping apparatus according to claim 3, wherein said restricting passage control means has a drive means which rotates said hollow rotor via said drive-force transmission shaft to shift said hollow rotor relative to the position of said cylindrical member in order to vary the sectional area of the apertures of said restricting passages.

5. A vibration damping apparatus according to claim 4, wherein said drive-force transmission shaft is integrally formed with said hollow rotor to transmit drive force from said drive means to said hollow rotor.

6. A vibration damping apparatus according to claim 5, wherein a through-hole is provided through the axial line of said drive-force transmission shaft and liquid is loaded into said main liquid chamber and said sub liquid chamber through said hollow rotor.

7. A vibration damping apparatus according to claim 1, wherein a screw member is provided on the external circumference of said cylindrical member so that said cylindrical member can be engaged with said first securing means via said screw member.

8. A vibration damping apparatus according to claim 1, wherein retention means is provided on the external circumference of said cylindrical member for permitting said cylindrical member to be engaged with said first securing member.

9. A vibration damping apparatus according to claim 1, wherein a groove is provided along an external periphery of said restricting passage forming member, and wherein said restricting passage forming member is assembled with said first securing means so as to form said restricting passages by closing an open end of said groove.

10. A vibration damping apparatus, comprising:
a first securing member which is connected to one of a vibration generating source and a vibration receiving member;
a second securing member which is connected to the other of said vibration generating source and said vibration receiving member,
an elastic member provides connection between said first and second securing members, said elastic member being subject to deformation whenever vibration occurs;
a main liquid chamber, a portion of a wall of which is formed by a part of said elastic member, said main liquid chamber being expansible and contractible;
a sub-liquid chamber separately provided in a position apart from said main liquid chamber;
a plurality of restricting passages, each of said plurality of restricting passages providing a connection between said main liquid chamber and said sub-liquid chamber;
a partition wall block which is integrally provided with a plurality of grooves along external sides thereof and which is assembled with said first securing member to form said plurality of restricting passages, said partition wall block separating said main and sub-liquid chambers and having a recess defining the perimeter and at least one surface of said sub-liquid chamber; and
a restricting passage control means is installed for at least one of said plurality of restricting passages, wherein said control means has an cylindrical member provided with an opening and wherein a hollow rotor is coaxially inserted in said cylindrical member for varying the sectional area of the aperture of said opening, and wherein said cylindrical member is inserted through a cylindrical through-hole passing through said first securing member and said partition wall block to said recess.

11. A vibration damping apparatus according to claim 10, further comprising:
a diaphragm mounted between said partition wall block and said second securing member, said diaphragm providing a second surface to complete definition of said sub-liquid chamber, wherein an air chamber is formed between said diaphragm and said second securing member.

12. A vibration damping apparatus according to claim 10, wherein said hollow rotor has a aperture in part of the circumferential wall thereof, and wherein said aperture is connected to said restricting passages.

13. A vibration damping apparatus according to claim 12, wherein said restricting passage control means is provided with a drive-force transmission shaft and a motor unit, wherein said drive-force transmission shaft is held on the axial line identical to that of said cylindrical member connected to said hollow rotor, and wherein said motor unit rotates said hollow rotor via said drive-force transmission shaft to shift said hollow, rotor relative to the position of the opening of said cylindrical member in order to vary the sectional area of the aperture of said opening.

14. A vibration damping apparatus according to claim 13, wherein said drive-force transmission shaft is integrally formed with said hollow rotor to transmit drive force from said motor unit to said hollow rotor.

15. A vibration damping apparatus according to claim 14, wherein a through-hole is provided through the axial line of said drive-force transmission shaft and said drive-force transmission shaft is disposed in such a way as enable said main liquid chamber and said sub liquid chamber to be filled with liquid via said hollow rotor.

16. A vibration damping apparatus according to claim 10, wherein screw member is provided on the external circumference of said cylindrical member so that said cylindrical member can be engaged with said first securing member via said screw member.

17. A vibration damping apparatus according to claim 10, wherein an elastic tube is provided on the external circumference of said cylindrical member so that said cylindrical member can be injected into said first securing member.

18. A vibration damping apparatus, comprising:
a first securing member which is connected to one of a vibration generating source and a vibration receiving member;
a second securing member which is connected to the other of said vibration generating source and said vibration receiving member;

an elastic member which provides a connection between said first securing member and said second securing member and is subject to deformation whenever vibration occurs;

a main liquid chamber, a portion of a wall of which is formed by a part of said elastic member, said main liquid chamber being subject to expansion and contraction when vibration occurs;

a sub-liquid chamber which is interconnected with said main liquid chamber via a plurality of restricting passages and which is subject to expansion and contraction when vibration occurs;

a partition wall block which is provided with a plurality of grooves along external sides thereof, wherein said partition wall block forms a plurality of restricting passages in association with said first securing member, said partition wall block separating said main liquid chamber from said sub-liquid chamber and having a recess defining the perimeter and at least one surface of said sub-liquid chamber, each of said plurality of restriction passages capable of communication between said main and sub-liquid chambers;

a cylindrical through-hole passing through said partition wall block to said recess, said through-hole connected to at least one of said plurality of restricting passages through an opening provided in a wall of said through-hole;

a flow control member having a cylindrical member that is inserted through an insertion hole in said first securing member and also through said through-hole provided in said partition block, a cylindrical wall portion of said cylindrical member that is inserted through said partition wall block having an opening, said opening at least corresponding to said opening of said through-hole, and a hollow rotor coaxially inserted in said cylindrical member, said hollow rotor having an aperture provided in a part of a circumferential wall for varying the sectional area of said opening in said through-hole and said cylindrical member by rotating;

a drive-force transmission shaft which is positioned coaxially and connected to said hollow rotor; and a motor unit which is secured to said driving force transmission shaft, said hollow rotor being rotated by said motor unit relative to said opening of said through-hole thereby varying the sectional area of the aperture of said opening of said through-hole.

* * * * *